United States Patent [19]

Feres

[11] 4,339,398

[45] Jul. 13, 1982

[54] COLUMN FOR HEAT AND MASS TRANSFER

[76] Inventor: Vaclav Feres, Haid- und Neu-Strasse 14, 7500 Karlsruhe 1, Fed. Rep. of Germany

[21] Appl. No.: 218,969

[22] Filed: Dec. 22, 1980

[30] Foreign Application Priority Data

Dec. 21, 1979 [DE] Fed. Rep. of Germany ....... 2951689

[51] Int. Cl.³ .............................................. B01F 3/04
[52] U.S. Cl. ................................................... 261/89
[58] Field of Search .................................. 261/89, 84

[56] References Cited

U.S. PATENT DOCUMENTS

| 214,571 | 4/1879 | Lauve | 261/89 |
|---|---|---|---|
| 896,365 | 8/1908 | Ernst | 261/89 |
| 2,048,888 | 7/1936 | Ott | 261/89 |
| 2,218,342 | 10/1940 | Pegram | 261/89 |
| 3,430,932 | 3/1969 | Kuechler | 261/89 |
| 3,758,085 | 9/1973 | Mentschel | 261/89 |

FOREIGN PATENT DOCUMENTS

| 247047 | 1/1910 | Fed. Rep. of Germany | 261/89 |
|---|---|---|---|
| 116807 | 6/1925 | Switzerland | 261/89 |
| 236575 | 2/1945 | Switzerland | 261/89 |
| 153109 | 11/1920 | United Kingdom | 261/89 |

OTHER PUBLICATIONS

Chemical Engineering; Aug. 8, 1960; pp. 58, 82 and 84.

Primary Examiner—Tim R. Miles
Attorney, Agent, or Firm—Craig and Antonelli

[57] ABSTRACT

A column for heat and mass transfer between a liquid and a gaseous phase has stage plates of which each is made up of a fixed ring part joined to the wall of the column, and a wheel part fixed to a turning shaft within the column. Each ring part and each wheel part are made bell-shaped or conical and the wheel part is nested within the fixed ring part and has blades on its lower face.

6 Claims, 3 Drawing Figures

COLUMN FOR HEAT AND MASS TRANSFER

BACKGROUND OF THE INVENTION (i) Field to which invention relates

The present invention is with respect to a column for heat and mass transfer between liquids and gaseous phases, that is to say vapors or gases, and made up of a column wall, spaced stage plates within said column wall placed one over the other, each stage plate having a ring part fixed to said column wall, and a wheel part supported in said column wall, and of a head inlet for liquid, the wheel parts being designed for centrifugally impelling liquid outwards forcing it over the ring part of each stage and then down onto the next stage plate thereunder on its way from the head inlet through a bottom of the column.

(ii) The prior art

The utility of a column is more specially dependent on the efficiency, the pressure drop, the possible working load and the range of possible change in characteristics of operation or adaptability. Efficiency is dependent on the degree of contact between the two phases (vapor and liquid) moving in counter-current and on the degree to which liquid is moved upwards by the vapor with it. The degree of contact goes up with the degree of turbulence between the phases, the turbulence in turn increasing the pressure drop.

The pressure drop between the column bottom and the column head may not be overgreat and has to be in line with conditions in industry. The upper limit to the operation temperature has to take into account the thermal stability of the product, this fixing however, the pressure in the bottom of the column. For each separation operation a certain number of stages (theoretical trays) is necessary, this controlling the pressure drop at each stage and for this reason the overall pressure drop. It will readily be seen from this that the efficiency and the pressure drop in the column might be made better by supplying energy to the column.

For this reason columns of the sort noted have been put forward (see Chemical Engineering 8.8.1960, pages 58, 82 and 84) in which the stages or trays are made of a fixed ring part and a wheel part in the middle. In the case of one first design of such a system the fixed ring parts are not placed one over the other—as is the case with a normal column with stage trays—but grouped together to take the form of a screw structure on which the liquid is transported downwards. In the open middle part of the screw structure or of the column a continuous shaft is placed on which spaced horizontal round plates are supported, between which and at some distance from the shaft generally axially running blades are placed. On turning the shaft the gaseous phase (gas or vapor) is aspirated in axially and forced generally radially outwards by the blades. At the same time the input of liquid takes place in such a way that it comes up against the blades and is impelled outwards. Because of the spraying of the liquid the pressure drop in the column is decreased while at the same time, because of the turning blades, there is a pressure increase in the gaseous phase. A shortcoming in this respect is however the complex design of the apparatus and the fact that it is hard for the thermodynamic or physical conditions to be kept under control from one stage to the next one so that, more specially, the separating effect is not in line with present day needs.

In the case of a further design on the lines noted, the fixed, unmoving ring part is made up of an overflow gutter fixed to the column and a ring-like gutter, fixed near to the middle of the apparatus and joined by way of arms with the overflow gutter. Within the ring-like gutter there is a wheel turned by a central shaft. In its parts over the ring-like gutter the wheel has openings and over these openings there are horizontal sheet metal guides on the outside of the wheel. On turning the wheel in the ring-like gutter the liquid within it is impelled centrifugally outwards, is forced upwards and comes out through openings in the gutter so that, because of the horizontal sheet metal guides a number of liquid veils, placed one over the other and generally horizontal, will be produced. The vapor or gas current is in an upward direction through the spaces between the arms and between the overflow gutter and the ring-like gutter, the gaseous phase then moving through the liquid veil. The liquid which is impelled outwards comes up against the wall of the column and then goes downwards in through the overflow gutter from which it goes onto the next stage plate. A part of the liquid, running onto the top side of the arm connections, goes back to the ring-like gutter. In the case of this column as well positive control of thermodynamic conditions is hard to take care of, because the liquid moving by way of the arm connections back into the ring-like gutter, that is to say which is only kept going in a small circuit without coming out of the circuit, is greatly dependent on the throughput and viscosity of the liquid. Furthermore it is not possible to make certain that the liquid undergoes mass transfer on every stage plate or tray, because an important part of the liquid, which comes from the overflow gutter, is not able to make its way downwards between the spaces between the arm connections of the next stage tray or plate. This amount of the liquid as well is greatly dependent on the throughput rate, the viscosity and the speed of the gaseous phase and furthermore on the conditions of flow.

OUTLINE OF THE INVENTION

One purpose of the present invention is that of so designing a column of the sort noted that on the one hand it may be used for all heat and mass transfer operations and more specially for temperature sensitive high boiling point liquids and furthermore for viscous liquids. A further purpose of the invention is that of making certain of the highest possible separation efficiency with the lowest possible drop in pressure.

This purpose is effected in the invention in that the fixed, unmoving ring part of each stage plate has a downwardly and inwardly stretching bell-like part, and the wheel part of the same stage plate is bell-like with a form answering to that of the bell-like part of the ring part, the wheel part furthermore having a lower face with blades stretching in an outward direction.

In the design of the present invention in each case the conical or bell-like ring part is nested in the bell-like part of the unmoving ring part next to it. The liquid coming up against the inner face of the wheel part is centrifugally impelled along the flared wall in an upward and outward direction and lastly is sent flying from the outer edge of the wheel towards the inner face of the column wall, it then running downwards onto the fixed ring part and then over this ring part in the space between its bell-like part and the bell-like wheel part in the next stage plate further down, that is to say on to the wheel part of the same. Not only on the bell-like or conical part of the ring part but furthermore on the wheel part the liquid will take the form of a thin film. The vapor goes counter-currently with respect to the liquid between the bell-like part of the ring part and the wheel part in an upward direction, it then being changed in direction at the overflow edge of the wheel part so as to go inwards and will then go between the wheel part and the ring part thereover towards the next stage plates further up. At the bell-like parts heat and mass transfer takes place, generally speaking, at the face of the liquid film, while in the outer part the vapor or the gas is forced through the liquid impelled by, and coming clear of the wheel part. The liquid film on the wheel part will be turbulent, that is to say turbulently flowing, the same being true of the liquid film on the bell-like part of the fixed ring part, because its face will all the time being acted upon by vortices coming from the blades, only spaced from it by a small distance, on the wheel part.

The blades placed on the lower side of the wheel part have the function of a fan so that, generally speaking, every stage of the column takes the form of a fan or blower. The increase in pressure produced by each such fan or blower stage, and for this reason the pressure loss over the full height of the column, may undergo adjustment by changing the speed of turning of the wheel part. For this reason it is more specially possible for the column to be run without, generally speaking, any pressure loss.

Because of the high level of mass and heat transfer and the chance of adjustment of the pressure drop, film thickness and residence time by way of changing the speed of turning of the wheel part, the column of the present invention may be more specially used for the vacuum rectification or distillation of liquids. Furthermore the column may be readily used or changed to be in line with different thermal needs or properties. The possible working load and the separation efficiency are better than with prior art columns.

Dirt or contamination, which may be caused by a dirty product or for example by overheating and degrading of the product, have hardly any effect on the operation of the column, dirt being swilled downwards into the bottom of the column because of the strong flow. Furthermore the column may be readily cleaned with solvents, which may be run in a circuit through the column if the wheel parts are put into operation. Lastly the design of the invention makes possible a simpler and more straightforward structure which is more readily possible to put together and makes certain of a low price level. Furthermore the column may be used to good effect under vacuum.

It is best for the blades of the rotor parts to be radial and be designed stretching over the radial length of the bell-like or conical part of the ring part so that this bell-like part, together with the blades, is responsible for forming a compression zone for the vapor phase.

The column is best so designed that the lower edges of the blades are clear of the top face of the bell-like part of the ring-part next to the blades, the space therebetween being adjustable so that on the one hand there is a division-up of the downwardly moving liquid into a thin film which may make its way downwards without any damming effect, while on the other hand turbulent phase contact is produced between the liquids and the counter-currently moving vapor.

As part of one working example of the invention the ring part has a horizontally running part near the wall of the column and, next to it on the inside, the bell-like or conical part, this making certain that there is no "running-away" of the column at high vapor speeds, that is to say of the liquid being so forcefully acted upon by the vapor or gas that it is entrained up into the next stage plate. In fact, with the invention, the liquid sent flying by the wheel part against the wall of the column is guided downwards so as to come together on the horizontal part of the ring part, it then running downwards over the bell-like part of the ring part.

In a further working example of the invention the wheel part has at its outer edge a generally horizontally placed sharp overflow edge which makes certain that the liquid is sent out flying horizontally in the form of drops or a veil.

In the case of a preferred working example of the invention the ring parts of the stage plates may be moved in relation to each other axially so that the liquid film on the bell-like part of the ring part may be changed in view of getting the best value with respect to the amount flowing back.

A useful effect is produced if the wheel parts are turned by way of a shaft running from the top to the bottom of the column, any change in the speed of turning then having an equal effect on all wheel parts.

This design of the column makes it possible for sliding spacer rings to be placed between the wheel parts on the shaft for gripping them in position, the spacer rings being screwed up tight, for example by way of nuts placed at the top and foot ends of the shaft. By changing the axial length of the spacer rings the spaces between the parts of the system may be changed to be in line with given needs. If necessary, in this respect, the size of the space may be changed by using spacer rings of different lengths so that there will be different spaces at different heights in the column.

A further design of the invention, which has a low price and may be very simply be put together from its parts and furthermore makes possible later changes for changes in condition of operation, is such that the column is made of a number of cylindrical rings, between which, in each case, one ring part of the separate stage plates is fixed, the cylindrical rings being forced together by way of three or more pull rods, so that the rings are fluid-tightly joined with each other.

BRIEF DESCRIPTION OF THE FIGURES

An account will now be given of one working example of the invention.

DETAILED ACCOUNT OF WORKING EXAMPLE

Figure 1:
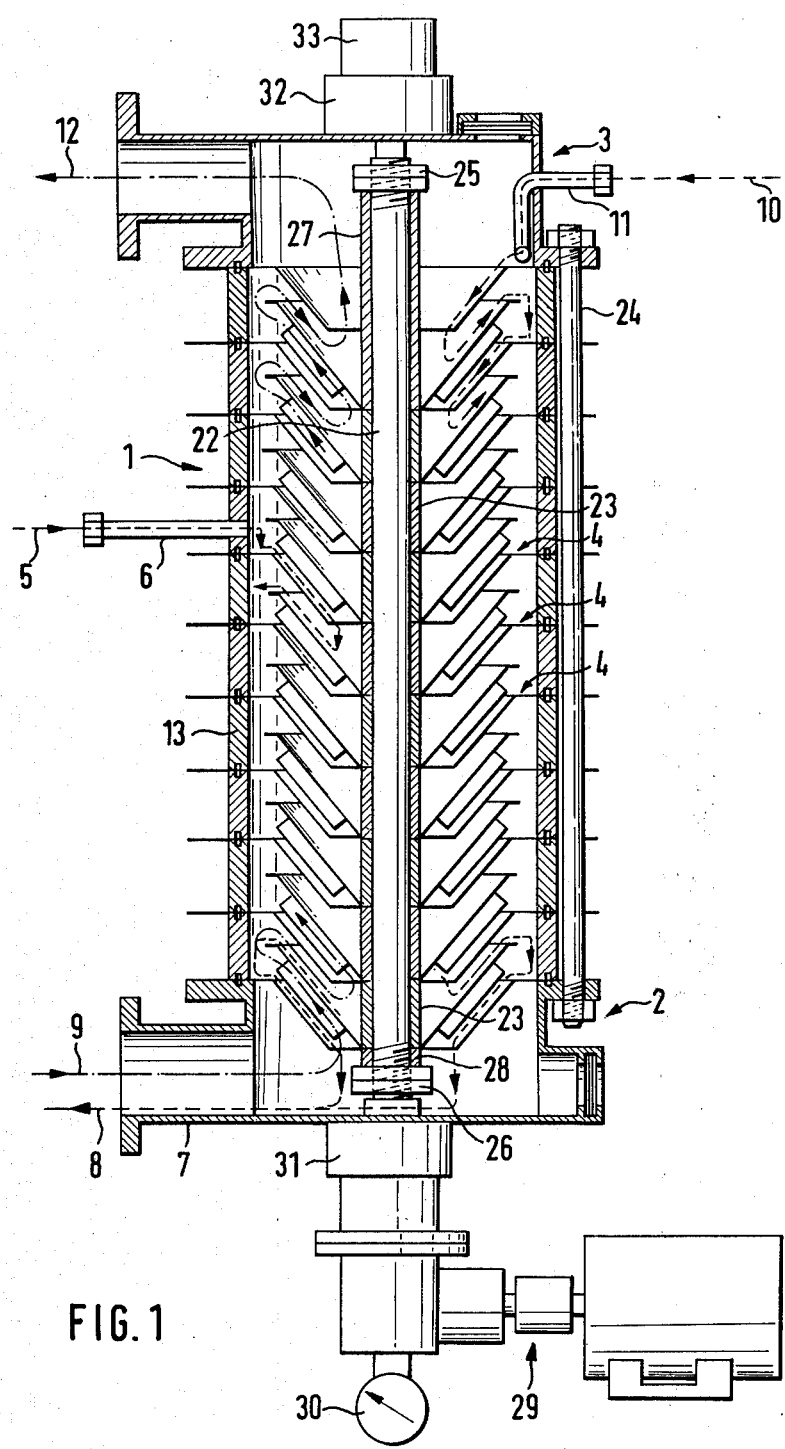
FIG. 1 is a lengthways section through a column forming a working example of the invention.

The column to be seen in FIG. 1 is made up of a column wall 1, a column bottom 2, a column head 3 and a number of stage plates 4 placed one over the other inside the column wall 1. The liquid unprocessed material or feed is run in at 5 by way of an inlet connection 6 into the column, it then running over the stage plates 4 in a downward direction towards column bottom 2 where it comes out through an outlet connection 7 at 8 to be taken up in a bottom liquid evaporator which, because it is of conventional design, is not figured. The vapor coming from the bottom liquid evaporator is run at 9 into column 1 while the bottom liquid which is not so evaporated is taken off for a different purpose. Lastly the vapor product comes out of the column through the head 3 at 12, it then being run into a condenser in which condensate is formed, which partly as reflux liquid is run at 10 by way of an inlet connection 11 into the head of column 1, while part of the condensate is taken off as a product of the system.

Figure 2:
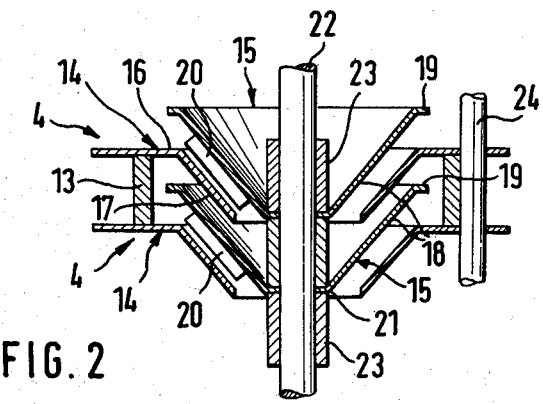
FIG. 2 is a lengthways section through two stage plates.
Figure 3:
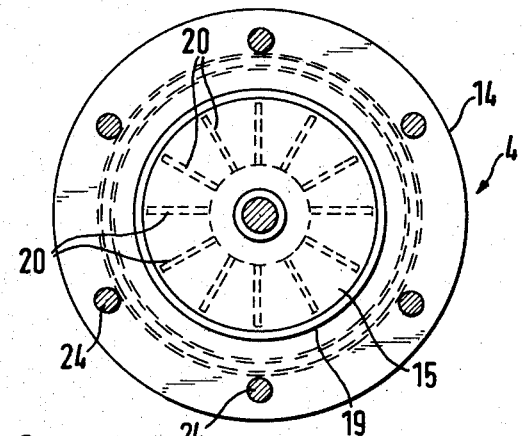
FIG. 3 is a plan view of the structure to be seen in FIG. 2.

As will be seen in more detail in FIG. 2, the column wall 1 is made up in this working example of a number of cylindrical rings 13 which at their end or radial faces have gaskets. Between each ring 13 and the next one a stage plate 4 is positioned, it being made up, in each case, of an outer fixed ring part 14 and an inner wheel part 15. The ring part 14 has a horizontal part 16, next to the column wall 1 and, next to it on the inner side, a downwardly and inwardly belled or conical part 17. Furthermore each wheel part 15 has a conical or bell-like part 18 running parallel to the bell-like part 17 of ring part 14, that is to say answering to it in form. Furthermore the wheel part 15 has at the outer edge of the bell-like part 18 a horizontally running overflow edge 19. On the lower side of each wheel part 15 or rotor part, that is to say the face turned towards the bell-like part 17 of the ring parts 14, a number of blades 20 are positioned whose lower edges are clear of the bell-like parts 17 of ring part 14 so as to give a narrow space or gap.

Each wheel part 15 has at its inner edge a collar 21 which is horizontal. The wheel parts 15 are turned together by a shaft 22 stretching for the full height of column wall 1. For this purpose spacer rings 23 are used, between which the collars 21 of the wheel parts are gripped and positioned.

Because the rings 13 of the column wall 1 are tightly forced together by a number of pull rods or tie rods 24, spacer rings 23 and for this reason the wheel parts 15 are forced together by the effect of nuts 25 and 26, placed at the top and foot ends of shaft 22. Between nuts 25 and 26 and the first and last wheel parts, spacer collars 27 and 28 are placed. Nuts 25 and 26 make possible adjustment and later changes in the spacing between the wheel part 15 and the ring part 14 or of the distance between the lower edges of blades 20 and the bell-like part 17 of the ring part under them in each case.

In FIG. 1 the flow of the liquid is marked in uniformly broken lines while the flow of the vapor or gas is marked with dot-dash lines. From this figure the reader will furthermore see how the liquid film is formed on each of the bell-like parts 17 of the ring parts 14 and of the wheel parts 15, the liquid being forced off from the overflow edge 19 of the wheel part 15 in the form of drops or veils so as to go up against the inner surface of the column wall 1 (see lower part of FIG. 1) then running down the wall with the form of a film on the bell-like part of the ring part on its way to the column bottom. The vapor forced to go in the opposite direction, that is to say in counter-current through the column, is compressed at the blades 20 and then on its way between the liquid drops or through the liquid veil and then, further in opposite counter-current direction in the form of a turbulent flow over the liquid film in the middle so that it is then aspirated by the "fan stage" of the top stage plate.

The system of FIG. 1 has a geared motor 29, only by way of example, with a tachometer 30. The output shaft of the gearing is taken through a shaft sleeve 31, which is best made high-vacuum-tight, into the bottom 2 of the column where it is joined to shaft 22. Furthermore the head of the shaft 22 is run through a shaft sleeve 32, tight against high vacuum and is then taken up in a bearing 33.

I claim:

1. A column for heat and mass transfer between liquid and gaseous phases comprising a column and exchange stage plates spaced one above another in said column, each exchange stage plate having an outer fixed ring part fixedly attached to said column and an inner wheel part rotationally supported at the center of the column, said outer fixed ring part having a horizontal section connected to a wall of the column and extending into the inside of the column therefrom as well as a downwardly directed conical section connected inside of said horizontal section, and said inner wheel part having a downwardly directed conical section with a substantially horizontal overflow edge connected to the periphery thereof and blades which are directed toward the fixed ring part and extend outwardly along a lower surface of the conical section of the wheel part over the radial extent of the conical part of the fixed ring part in a manner defining a narrow gap between lower edges of the blades and the conical section of the fixed ring part, whereby fluid running downward, from a feeding point of the column, over the fixed ring part is distributed outwardly in a thin film without damming up and upward entrainment by gaseous phases.

2. A column as claimed in claim 1 wherein the ring parts and the wheel parts of the stage plate may be moved axially in relation to each other.

3. A column as claimed in claim 2, wherein the wheel parts are powered by a common shaft stretching from the top to the foot end of the column.

4. A column as claimed in claim 3, wherein between the wheel parts spacer rings are placed round the shaft for gripping wheel parts between them.

5. A column as claimed in claim 4, wherein the spacer rings are forced together by nuts placed at the top and foot ends of the shaft.

6. A column as claimed in claim 5, wherein the column is made up of a number of cylindrical rings, between which, in each case, the stage plates are fixed and which are forced together by pull rods so as to be fluid-tight.

* * * * *